United States Patent
Groff et al.

(10) Patent No.: US 7,428,503 B1
(45) Date of Patent: Sep. 23, 2008

(54) METHODS AND SYSTEMS FOR PROVIDING PRODUCT AND SERVICES UPGRADES AND WORK ORDER STATUS IN A CABLE SERVICES NETWORK

(75) Inventors: Vincent Groff, Dunwoody, GA (US); Steve Calzone, Duluth, GA (US); John Kelly King, Asheville, NC (US); Bruce Beeco, Buford, GA (US)

(73) Assignee: Cox communications, INC, Atlanta, GA (US)

( * ) Notice: Subject to any disclaimer, the term of this patent is extended or adjusted under 35 U.S.C. 154(b) by 468 days.

(21) Appl. No.: 11/002,913

(22) Filed: Dec. 2, 2004

Related U.S. Application Data (60) Provisional application No. 60/622,110, filed on Oct. 26, 2004.

(51) Int. Cl.
*G06Q 30/00* (2006.01)
(52) U.S. Cl. .............................. 705/26; 705/8; 705/10; 705/28; 725/60; 725/116; 345/E5.104; 345/E5.105; 345/E7.071; 345/E7.073
(58) Field of Classification Search ................... 705/8, 705/10, 26, 28; 725/60; 709/223; 348/E5.104, 348/E5.105, E7.071, E7.073
See application file for complete search history.

(56) References Cited

U.S. PATENT DOCUMENTS

| 6,177,931 | B1 | 1/2001 | Alexander et al. | 725/52 |
| 6,718,551 | B1 | 4/2004 | Swix et al. | 725/32 |
| 2002/0049624 | A1* | 4/2002 | Raveis, Jr. | 705/8 |
| 2002/0078453 | A1 | 6/2002 | Kuo | 725/46 |
| 2002/0169656 | A1* | 11/2002 | Al-Azzawe | 705/10 |
| 2003/0046700 | A1* | 3/2003 | Wilcox et al. | 725/60 |
| 2003/0084449 | A1 | 5/2003 | Chane et al. | 725/46 |
| 2003/0200159 | A1* | 10/2003 | Kay et al. | 705/28 |
| 2003/0229898 | A1 | 12/2003 | Babu et al. | 725/87 |
| 2005/0160458 | A1 | 7/2005 | Baumgartner | 725/46 |
| 2005/0172325 | A1* | 8/2005 | Henry et al. | 725/116 |
| 2005/0256952 | A1* | 11/2005 | Mouhanna et al. | 709/223 |
| 2006/0248555 | A1 | 11/2006 | Eldering | 725/34 |
| 2006/0293971 | A1* | 12/2006 | Hunter et al. | 705/26 |

OTHER PUBLICATIONS

U.S. Office Action dated Feb. 22, 2008 cited in U.S. Appl. No. 10/855,292.

* cited by examiner

*Primary Examiner*—Yogesh C. Garg
(74) *Attorney, Agent, or Firm*—Merchant & Gould (57) ABSTRACT

Methods and systems are provided for allowing a cable services customer to efficiently order desired products and services through an automated self-provisioning process provided through an interactive television session between the customer and a cable services provider.

20 Claims, 7 Drawing Sheets

METHODS AND SYSTEMS FOR PROVIDING PRODUCT AND SERVICES UPGRADES AND WORK ORDER STATUS IN A CABLE SERVICES NETWORK

RELATED APPLICATIONS

This application claims the benefit of U.S. Provisional Application, entitled "Methods and Systems for Providing Products and Services Upgrades and Work Order Status in a Cable Services Network", filed with the U.S. Patent and Trademark Office on Oct. 26, 2004 and assigned U.S. Ser. No. 60/622,110.

FIELD OF THE INVENTION

The present invention relates to ordering products and services and checking the status of pending work orders via an interactive television session in a cable services network.

BACKGROUND OF THE INVENTION

With the advent of cable services networks, cable customers have grown accustomed to receiving a variety of television programming from numerous broadcasting sources. In recent years, technology advances have enabled customers to receive an even greater variety of products and services through cable services networks. Modern cable services networks provide traditional video television programming, telephone services, high speed internet access, electronic mail services, video-on-demand, information services, and the like. Through the use of set-top boxes (computing systems), cable services providers can provide interactive television services to customers. Such interactive television services allow customers to interact directly with services providers in response to services and product offerings presented to the customers through their television sets.

Unfortunately, according to prior systems, once a customer decides to order an offered or promoted product or service, or if the customer desires information on a pending work order associated with a previously ordered product, service or upgrade, the customer must call the product/services provider to complete an order or to determine the status of a pending work order. Often when the customer calls the product/services provider, the customer is placed on hold for a lengthy period of time. Because many calls to product/services providers are based on impulse buying a calling customer may hang up rather than stay on hold resulting in a lost sale. Even after the customer is connected to a sales agent, the customer may have to spend a lengthy period of time providing information to the sales agent. And, in many cases, the customer calls the product/services provider to check the status of a previous order, but finds the difficulty of receiving the status information unacceptable.

Accordingly, there is a need in the art for methods and systems for allowing cable services customers to order offered products and services and to check the status of pending work orders associated with previously ordered products and services via an automated interactive session between the customer and the cable services provider. It is with respect to these and other considerations that the present invention has been made.

SUMMARY OF THE INVENTION

Embodiments of the present invention solve the above and other problems by providing methods and systems for self-provisioning offered products and services and for automatically determining the status of pending work orders associated with previously offered products and services via an interactive television services session between a customer and a cable services network.

According to aspects of the present invention, a cable services provider may offer a variety of products and/or services via one or more promotional screen displays or user interfaces presented to a customer at the customer's television set. Upon selection of a given product or service offering or upon a request for information regarding a pending work order associated with a previously ordered product or service, an upgrade center user interface is launched at the customer's television set. If the customer requests work-order status information on a previously ordered product or service, a status request is sent from the customer's cable services set-top box to a backend application server. From the application server, a data call is passed to a web services system from which a query is sent to one or more data services containing information requested by the customer. In response to the data call from the web services system, information regarding the status of the customer's previously ordered product or service is passed back to the application server via the web services system. At the application server, a work order status update message is formatted and is passed to the customer's set-top box which, in turn, presents the work order status to the customer at the customer's television set.

If the customer desires to order an offered product or service, the customer may select a given offered product or service through one or more promotional displays or user interfaces presented to the customer. Upon selection of a particular product or service, a product/service description may be requested from the customer's set-top box for presentation to the customer at the customer's television set. If the customer selects the presented product or service for provisioning to the customer via the customer's cable services set-top box, a determination is made as to whether the selected product or service is presently available for provisioning to the customer. If the selected product or service is not presently available, a customer lead generation form may be automatically generated and populated with information about the customer from a customer data profile maintained for the customer at the customer's set-top box. In addition to the information pre-populated into the customer lead generation form from the customer data profile, additional information may be requested from the customer through an interactive television session in which the customer may provide information using the customer's television remote control device. Once the customer lead generation form is completed, the form may be submitted to the backend application server via the customer's set-top box so that sales personnel of the cable services network may receive the customer lead generation form and follow-up with the customer once the requested product or service becomes available.

If the selected product or service is available, an order form for the selected product or service may be automatically generated and pre-populated from customer information maintained in the customer data profile maintained for the customer at the customer's set-top box. Prior to processing an order for the selected product or service, an order qualification analysis is performed for the selected product or service. First, a determination is made as to whether the selected product or service is available at the service address associated with the customer. If not, an error message may be presented to the customer, and a customer lead generation form may be prepared for the customer for forwarding to cable services network sales personnel. Next, a determination may be made as to whether services codes for the ordered product or service are already provisioned for the customer. That is, a determination is made as to whether the ordered product or service is already provisioned on the customer's set-top box. Next, a determination is made as to whether a work order for the selected product or service order is already opened for the customer's service address. Next, a determination may be made as to whether any other prerequisites for providing the ordered product or service are met for the ordering customer, for example whether a customer requesting electronic mail services has a required high speed Internet connection. According to aspects of the invention, the order qualification determinations described herein are made by requesting information about the customer from a backend data services system by passing an identifier for the customer's set-top box to the backend data services system via a backend application server and web services system.

If the selected product or service order is qualified, as described, order completion options may be requested from the customer via an interactive television services session from the customer's cable services set-top box. For example, the customer may be asked whether the product or service may be self-installed, or whether professional installation is required. For another example, the customer may be provided with a number of installation times available at the customer's service address. For another example, the customer may be provided with options such as product equipment types, data transmission speeds associated with ordered services, and the like. Once required product/service order options selections are made by the customer, the customer's product or service order is processed by the customer's cable services provider, and information regarding the customer's order including installation times and pricing are forwarded to the customer's set-top box from the cable services provider for presentation to the customer at the customer's television set. If the customer is not satisfied with the provided information, the customer may make changes to the product/service order through additional interactive communication with the cable services provider. Once the customer is satisfied with information confirming the customer's product or service order, an order confirmation is presented to the customer at the customer's television set.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention as claimed.

DETAILED DESCRIPTION

As briefly described above, embodiments of the present invention are directed to methods and systems for allowing a cable services customer to self-provision offered products and services, and for allowing the customer to automatically obtain work order status information for previously ordered products and services via an interactive television services session in a cable services network. These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents. Referring now to the drawings, in which like numerals refer to like elements throughout the several figures, embodiments of the present invention and an exemplary operating environment will be described.

Operating Environment

Figure 1:
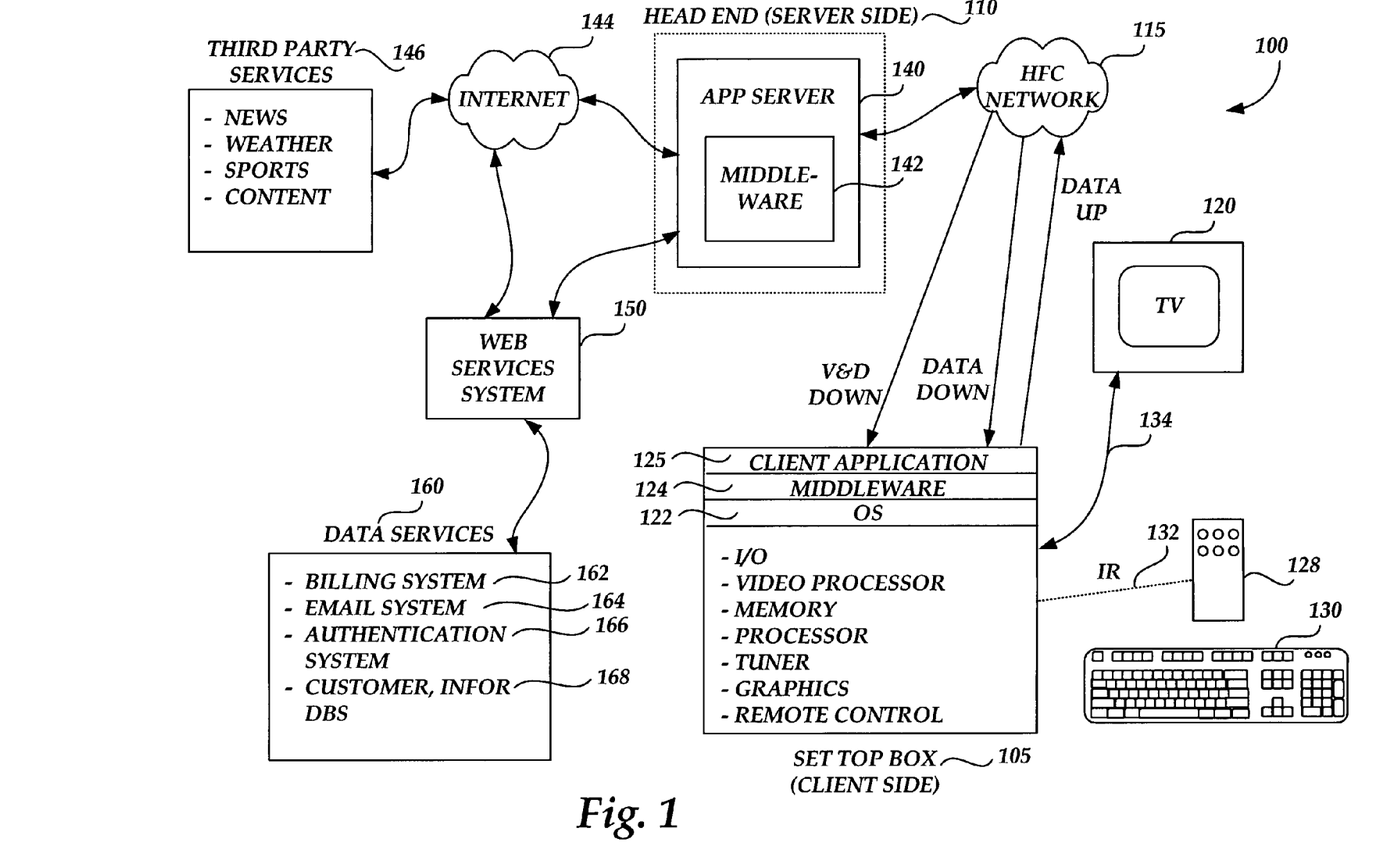
FIG. 1 is a simplified block diagram illustrating a cable services network architecture that serves as an exemplary operating environment for the present invention.

FIG. 1 is a simplified block diagram illustrating a cable television/services system (hereafter referred to as "CATV") architecture that serves as an exemplary operating environment for the present invention. Referring now to FIG. 1, digital and analog video programming, information content and interactive television services are provided via a hybrid fiber coax (HFC) network 115 to a television set 120 for consumption by a cable television/services system customer. As is known to those skilled in the art, HFC networks 115 combine both optical fiber and coaxial cable lines. Typically, optical fiber runs from the cable head end 110 to neighborhoods of 500 to 2,000 customers. Coaxial cable runs from the optical fiber feeders to each customer. According to embodiments of the present invention, the functionality of the HFC network 115 allows for efficient bidirectional data flow between the client-side set-top box 105 and the server-side application server 140 of the present invention.

According to embodiments of the present invention, the CATV system 100 is in the form of a distributed client-server computing system for providing video and data flow across the HFC network 115 between server-side services providers (e.g., cable television/services providers) via a server-side (backend) head end 110 and a client-side customer via a client-side set-top box (STB) functionally connected to a customer receiving device, such as the television set 120. As is understood by those skilled in the art, modern CATV systems 100 may provide a variety of services across the HFC network 115 including traditional digital and analog video programming, telephone services, high speed Internet access, video-on-demand, and information services.

On the client side of the CATV system 100, digital and analog video programming and digital and analog data are provided to the customer television set 120 via the set-top box (STB) 105. Interactive television services that allow a customer to input data to the CATV system 100 likewise are provided by the STB 105. As illustrated in FIG. 1, the STB 105 is a multipurpose computing device having a computer processor, memory and an input/output mechanism. The input/output mechanism receives input from server-side processes via the HFC network 115 and from customers via input devices such as the remote control device 128 and the keyboard 130. The remote control device 128 and the keyboard 130 may communicate with the STB 105 via a suitable communication transport such as the infrared connection 132. The STB 105 also includes a video processor for processing and providing digital and analog video signaling to the television set 120 via a cable communication transport 134. A multi-channel tuner is provided for processing video and data to and from the STB 105 and the server-side head end system 110, described below.

The STB 105 also includes an operating system 122 for directing the functions of the STB 105 in conjunction with a variety of client applications 126. For example, if a client application 125 requires a news flash from a third-party news source to be displayed on the television 120, the operating system 122 may cause the graphics functionality and video processor of the STB 105, for example, to output the news flash to the television 120 at the direction of the client application 126 responsible for displaying news items.

Because a variety of different operating systems 122 may be utilized by a variety of different brands and types of set-top boxes, a middleware layer 124 is provided to allow a given software application to be executed by a variety of different operating systems. According to an embodiment of the present invention, the middleware layer 124 may include a set of application programming interfaces (API) that are exposed to client applications 126 and operating systems 122 that allow the client applications to communicate with the operating systems through common data calls understood via the API set. As described below, a corresponding middleware layer is included on the server side of the CATV system 100 for facilitating communication between the server-side application server and the client-side STB 105. According to one embodiment of the present invention, the middleware layer 142 of the server-side application server and the middleware layer 124 of the client-side STB 105 format data passed between the client side and server side according to the Extensible Markup Language (XML).

The set-top box 105 passes digital and analog video and data signaling to the television 120 via a one-way communication transport 134. The STB 105 may receive video and data from the server side of the CATV system 100 via the HFC network 115 through a video/data downlink and data via a data downlink. The STB 105 may transmit data from the client side of the CATV system 100 to the server side of the CATV system 100 via the HFC network 115 via one data uplink. The video/data downlink is an "in band" downlink that allows for digital and analog video and data signaling from the server side of the CATV system 100 through the HFC network 115 to the set-top box 105 for use by the STB 105 and for distribution to the television set 120. As is understood by those skilled in the art, the "in band" signaling space operates at a frequency between 54 and 860 megahertz. The signaling space between 54 and 860 megahertz is generally divided into 6 megahertz channels in which may be transmitted a single analog signal or a greater number (e.g., up to ten) digital signals.

The data downlink and the data uplink, illustrated in FIG. 1, between the HFC network 115 and the set-top box 105 comprise "out of band" data links. As is understand by those skilled in the art, the "out of band" frequency range generally lies between zero and 54 megahertz. According to embodiments of the present invention, data flow between the client-side set-top box 105 and the server-side application server 140 is typically passed through the "out of band" data links. Alternatively, an "in band" data carousel may be positioned in an "in band" channel into which a data feed may be processed from the server-side application server 140 through the HFC network 115 to the client-side STB 105. Operation of data transport between components of the CATV system 100, described with reference to FIG. 1, is well known to those skilled in the art.

Referring still to FIG. 1, the head end 110 of the CATV system 100 is positioned on the server side of the CATV system and includes hardware and software systems responsible for originating and managing content for distributing through the HFC network 115 to client-side STBs 105 for presentation to customers via televisions 120. As described above, a number of services may be provided by the CATV system 100, including digital and analog video programming, interactive television services, telephone services, video-on-demand services, targeted advertising, and provision of information content.

The application server 140 is a general-purpose computing system operative to assemble and manage data sent to and received from the client-side set-top box 105 via the HFC network 115. As described above with reference to the set-top box 105, the application server 140 includes a middleware layer 142 for processing and preparing data from the head end of the CATV system 100 for receipt and use by the client-side set-top box 105. For example, the application server 140 via the middleware layer 142 may obtain data from third-party services 146 via the Internet 140 for transmitting to a customer through the HFC network 115 and the set-top box 105. For example, a weather report from a third-party weather service may be downloaded by the application server via the Internet 144. When the application server 140 receives the downloaded weather report, the middleware layer 142 may be utilized to format the weather report for receipt and use by the set-top box 105. According to one embodiment of the present invention, data obtained and managed by the middleware layer 142 of the application server 140 is formatted according to the Extensible Markup Language and is passed to the set-top box 105 through the HFC network 115 where the XML-formatted data may be utilized by a client application 126 in concert with the middleware layer 124, as described above. As should be appreciated by those skilled in the art, a variety of third-party services data, including news data, weather data, sports data and other information content may be obtained by the application server 140 via distributed computing environments such as the Internet 144 for provision to customers via the HFC network 115 and the set-top box 105.

According to embodiments of the present invention, the application server 140 obtains customer profile data from services provider data services 160 for preparing a customer profile that may be utilized by the set-top box 105 for tailoring certain content provided to the customer and for pre-populating product/services order forms and customer lead generation forms. As illustrated in FIG. 1, the services provider data services 160 include a number of services operated by the services provider of the CATV system 100 which may include data on a given customer. For example, a billing system 162 may include information such as a customer's name, street address, business identification number, Social Security number, credit history, and information regarding services and products subscribed to by the customer. An electronic mail system 164 may contain information such as electronic mail addresses, high-speed Internet access subscription information and electronic mail usage data. An authentication system 166 may include information such as secure user names and passwords utilized by customers for access to network services.

The customer information database 168 may include general information about customers such as place of employment, business address, business telephone number and demographic information such as age, gender, educational level, and the like. The customer information database may also include information on products and services subscribed to by a customer from her cable services provider. For example, in accordance with embodiments of the present invention, the customer information database may contain data to allow a determination as to whether a particular product or service is already provisioned at a customer service address or whether a work order is pending for a particular product or service provisioning at the customer service address. The customer information database may also include information that allows for a determination as to whether prerequisites for provisioning a requested product of service are met by a requesting customer. For example, if a customer requests electronic mail services and high speed Internet access is a prerequisite for electronic mail services, the customer information database may be queried to determine whether the required Internet access is provisioned at the requesting customer location or address.

As should be understood by those skilled in the art, the disparate data services systems 162, 164, 166, 168 are illustrated as a collection of data services for purposes of example only. The example data services systems comprising the data services 160 may operate as separate data services systems, which communicate with a web services system (described below) along a number of different communication paths and according to a number of different communication protocols.

Referring still to FIG. 1, a web services system 150 is illustrated between the application server 140 and the data services 160. According to embodiments of the present invention, the web services system 150 serves as a collection point for data requested from each of the disparate data services systems comprising the data services 160. When the application server 140 requires customer profile data from one or more of the data services 160 for preparation or update of a customer profile, the application server 140 passes a data query to the web services system 150. The web services system formulates a data query to each of the available data services systems for obtaining any available data for a given customer as identified by a set-top box identification associated with the customer. The web services system 150 serves as an abstraction layer between the various data services systems and the application server 140. That is, the application server 140 is not required to communicate with the disparate data services systems, nor is the application server 140 required to understand the data structures or data types utilized by the disparate data services systems. The web services system 150 is operative to communicate with each of the disparate data services systems for obtaining necessary customer profile data. The customer profile data obtained by the web services system is assembled and is returned to the application server 140 for ultimate processing via the middleware layer 142, as described above.

Operation

Figure 2:
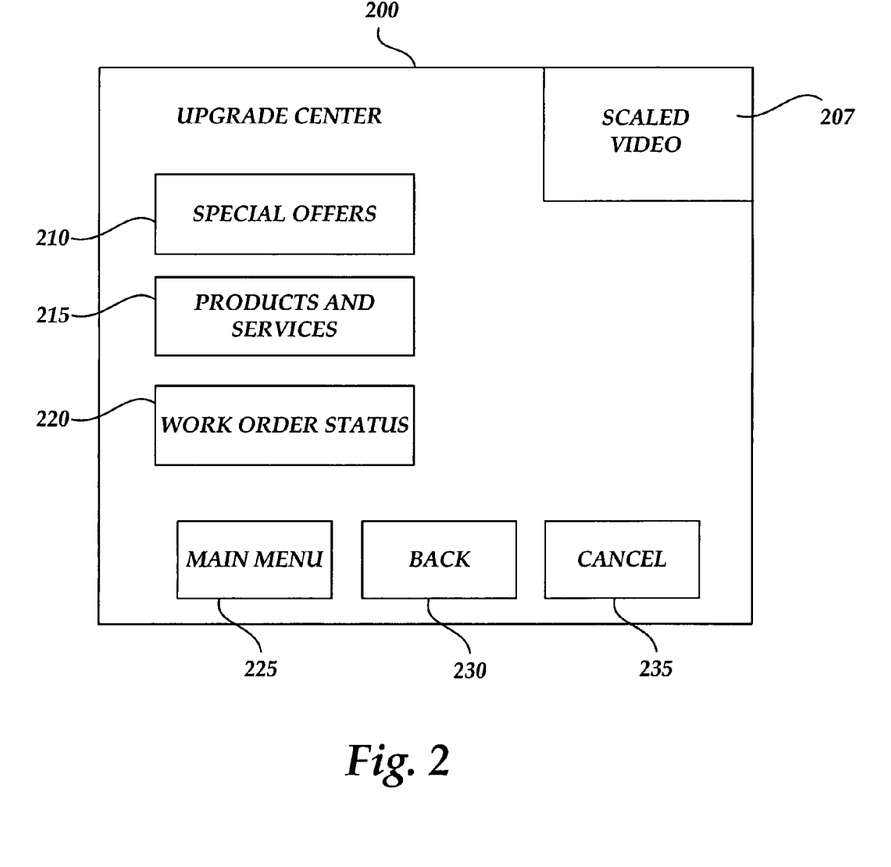
FIG. 2 is a simplified block diagram illustrating a television screen display of an interactive television services main menu according to embodiments of the present invention.

According to embodiments of the present invention, in order for a cable services customer to order an offered product or service, or to obtain work order status information for a previously ordered product or service, or for obtaining information regarding special offers provided by the customer's cable services provider, the customer may launch an upgrade center user interface 200, illustrated in FIG. 2. The upgrade center user interface 200 is a screen display/user interface presented on the user's television set 120 from the set-top box 105 with which the user may interact using the remote control device 128 for selecting special offers, products/services, and work order status information.

Referring to FIG. 2, the upgrade center user interface 200 includes a button 210 for selecting special offers promoted by the cable services provider. A button 215 is provided for allowing a user to select offered products and services. A button 220 is illustrated for allowing a user to select work order status information regarding previously ordered products or services. A main menu button 225 is illustrated for allowing the user to return to a main menu of all services provided by the cable services network described below with respect to FIG. 3. A back button 230 allows the user to return to a previously displayed screen, and a cancel button 235 allows the user to dismiss the upgrade center user interface 200 and return to regular television viewing. A scaled video pane 207 is illustrated in the upper right hand corner of the user interface 200 for allowing the user to continue receive a previously viewed television program while the user is interacting with the upgrade center user interface 200.

According to embodiments of the present invention, the upgrade center user interface 200 is presented to the user from the set-top box 105, and interaction with the upgrade center user interface 200 allows the user to interact with the functionality of the set-top box 105, and further allows the user to interact with the functionality and services provided by the cable services provider on the server side of the cable services network described above with reference to FIG. 1. As will be described in further detail below with reference to FIGS. 6 and 7, selection of the special offers button 210 causes a presentation on the user's television set 120 of one or more products or services offerings promoted by the customer's cable services provider. For example, a cable services provider may be promoting an upcoming entertainment or sporting event that may be available to the customer in coming weeks. In response to selection of the special offers button 210, the set-top box 105 may download and display onto the customer's television set a display screen containing a promotional advertisement such as "coming next month, don't miss the championship soccer match which may be ordered from your services provider for $10.00—for more information contact your cable services provider."

For self-provisioning offered products and services, the customer may select the products and services button 215 to receive a listing of available products and services that may be ordered by the customer through an interactive television session described herein. Once the customer is provided a listing of available products or services, the customer may use her remote control device 128 to select a desired product or service for provisioning at the customer's service location/address as described below with reference to FIGS. 6 and 7.

If the customer has previously ordered a new product or service, the customer may obtain pending work order status information with respect to a previously ordered product or service by selecting the work order status button 220. Upon selecting the work order status button 220, the set-top box 105 queries the server side of the cable services network for information regarding in-progress work orders. If more than one work order is in progress, the customer may be provided with a listing of all work orders in progress from which the customer may select to receive status information for a particular work order as described below with reference to FIGS. 6 and 7.

The customer may launch the upgrade center user interface 200 from a variety of other television display screens (user interfaces) provided to the customer from the customer's cable services provider. For example, the customer may launch the upgrade center 200 from a main menu of cable services by selecting a product/services advertisement display, by selectively responding to a broadcast advertisement, by selecting an advertisement displayed on an unprovisioned television channel, or by selecting a product/services advertisement listed via an interactive program guide application (IPG). As should be understood by those skilled in the art, the foregoing methods (described below) of launching the upgrade center user interface 200 are by way of example only and are not restrictive of the numerous television screen displays or other forms of displayable user interfaces that may be provided for allowing the user to access the upgrade center user interface 200.

Figure 3:
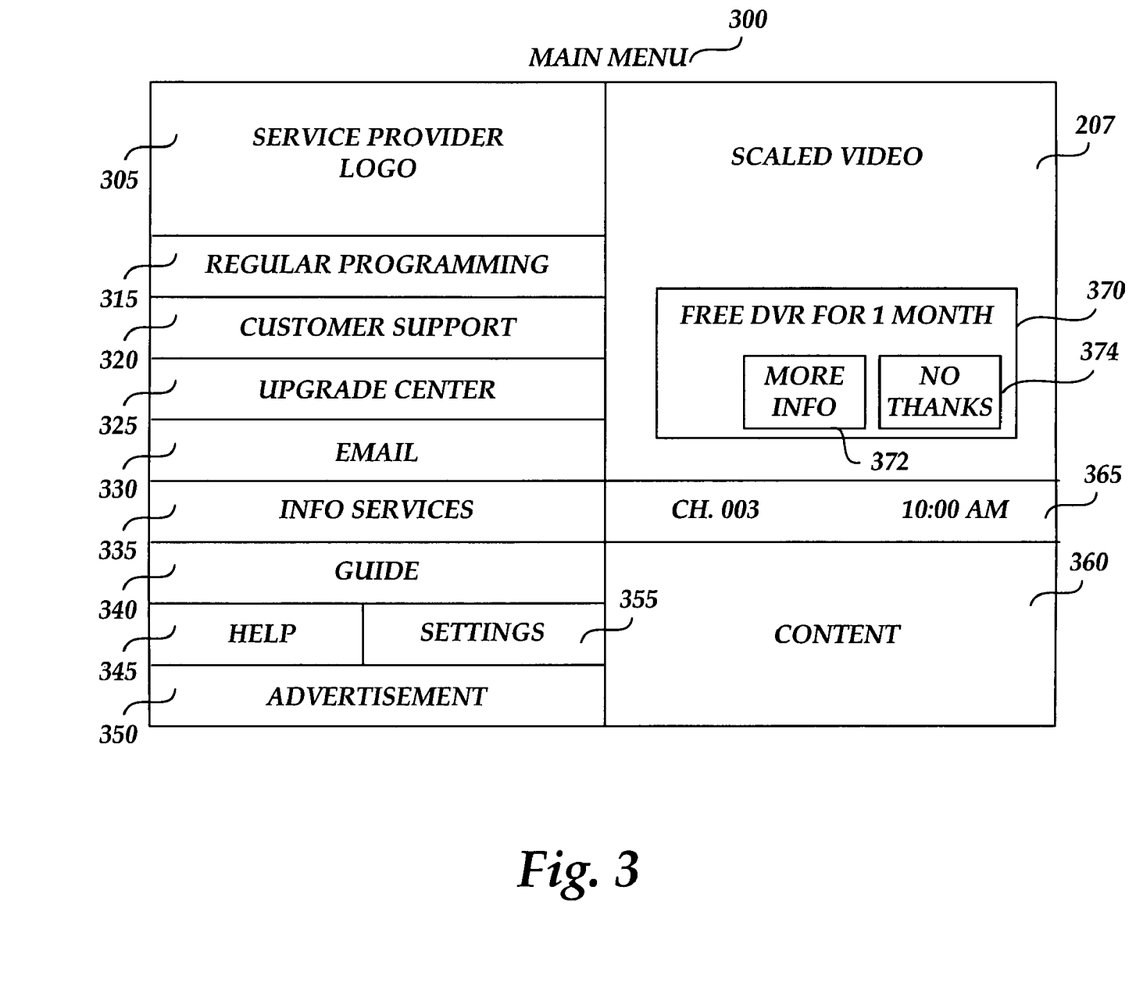
FIG. 3 is a simplified block diagram illustrating a television screen display of an upgrade center user interface according to embodiments of the present invention.

FIG. 3 is a simplified block diagram illustrating a television screen display of an interactive television services main menu according to embodiments of the present invention. Referring to FIG. 3, a client application 125 operating on the set-top box 105 may cause the presentation of a variety of menus that are displayed to the customer on the customer television 120. For example, the main menu 300 illustrated in FIG. 3 is representative of a first or main menu from which a customer may select other services provided by the customer's cable television services provider, or through which the customer may be provided targeted advertising and/or information content. As should be understood, the layout and content illustrated in FIG. 3 is for purposes of example only and is not limiting of the variety of different layouts and types of content that may be included in such a menu according to embodiments of the present invention.

The main menu television screen display 300 includes a service provider logo area 305 in the upper left-hand corner where the service provider may include their name, trademark or other identifying logo. A number of selectable buttons are provided with which the customer may select functionality from the main menu using the customer's remote control 128. For example, a regular programming button 315 is illustrated for allowing the user to dismiss the main menu screen and return to regular full-screen video programming. A customer support button 320 is provided for allowing the user to select a customer support application for obtaining information about services or products associated with the customer's cable television services subscription.

An upgrade center button 325 is provided for allowing the user to launch a user interface with which the user may order, upgrade or otherwise change subscribed services or products. According to embodiments of the present invention, selection of the upgrade center button 325 automatically launches the upgrade center user interface 200, illustrated in FIG. 2.

An electronic mail button 330 is provided for allowing the user to launch an electronic mail session with which the user may review and dispose of electronic mail messages received via the electronic mail system 164. A guide button 340 is provided for allowing the subscriber to receive helpful information such as television listings, services and product offerings, and the like. A help button 345 is provided for allowing the user to obtain helpful information regarding utilization of subscribed services. A settings button 355 is provided for allowing a user to check and modify subscribed services settings. A scaled video pane 207 is illustrated in which video programming is displayed while the user is viewing other portions of the main menu display 300. For example, a television channel last viewed by the customer prior to selection of the main menu display 300 may be presented to the user in the scaled video pane 207 to prevent the user from missing desired portions of a video presentation.

A content pane 360 is provided for displaying informational content to a customer. The content may be targeted to a specific customer based on customer profile data maintained for the customer in a customer profile. For example, weather information keyed to a customer's home address or ZIP code may be obtained from a third-party services system 146 and may be displayed in the content pane 360. If no customer profile data is available for a given customer, or if a default customer profile is prepared for a given customer, default content may be displayed to the customer in the content pane 360.

An advertisement pane 350 provides a space for targeted advertisement directed to the customer. If no targeted advertisement content is available or appropriate, the advertisement pane 350 may be populated with a default advertisement that is not specific to the customer of the main menu 300. According to embodiments of the present invention, the content provided in the advertisement pane 350 may allow the user to select an advertised product or service for launching the upgrade center user interface 200. For example, a targeted advertisement directed to the customer or a default advertisement may provide information regarding a particular product or service.

Along with the advertisement, one or more buttons (not shown) may be provided in the content of the advertisement pane to allow the user to order or obtain more information on the advertised product or service. For example, an advertisement may be included in the advertisement pane 350 regarding a product such as high speed Internet (HSI) access which is available at the customer's service address. A button may be provided in the content of the advertisement pane such as "Order Now" or "More Information" which may be selected by the customer using the remote control device 128. Selecting one or more of such buttons may automatically launch the upgrade center user interface 200, illustrated in FIG. 2. Alternatively, the main menu 300 may be programmed such that selection of any location in the advertisement pane 350 by the customer using the customer's remote control 128 will cause the upgrade center user interface 200 to be launched by the set-top box 105 onto the user's television set 120.

As described above, another entry point for accessing the upgrade center user interface 200 is through a specially broadcast advertisement presented to the customer by the customer's cable services provider. As illustrated in FIG. 3, in the scaled video pane 205, the television channel being viewed by the customer prior to selecting the main menu 300 is displayed. As should be understood, the content illustrated in the scaled video pane 205 is also illustrative of content that may be displayed on the customer's television set 120 prior to selecting and launching the main menu 300. According to this aspect of the invention, the customer's cable services provider may broadcast an advertisement during regular television programming advertising a product or service offered by the cable services provider. Such an advertisement is displayed to the customer in the same manner as any advertisement displayed to the customer from any advertising source.

In order to allow a customer to automatically order the advertised product or service, product/service ordering information pane is imbedded in the broadcast video as illustrated in the information pane 370 shown in the scaled video 205. For example, the illustrated information pane 370 includes an example product offering of "Free digital video recorders for one month." A button "More Information" 372 and a button "No Thanks" 374 are also provided. By selecting one of the buttons 372, 374, the customer is able to interact with the cable services provider in response to the broadcast advertisement. That is, while the customer is viewing the advertisement, the customer may utilize her remote control device 128 to select "More Information" button 372, for example, to obtain more information on the advertised product or service via an interactive television session.

According to embodiments of the present invention, if the customer selects the "More Information" button 372, the set-top box 105 launches the upgrade center user interface 200 onto the customer's television set 120, as described above. As should be understood, the information contained in the pane 370 and the buttons 372, 374 is for purposes of illustration only and is not restrictive of the types of information that may be provided. For example, a button may be provided such as "Order Now" and information concerning a variety of products/services offerings may be included in the imbedded information pane 370.

Figure 4:
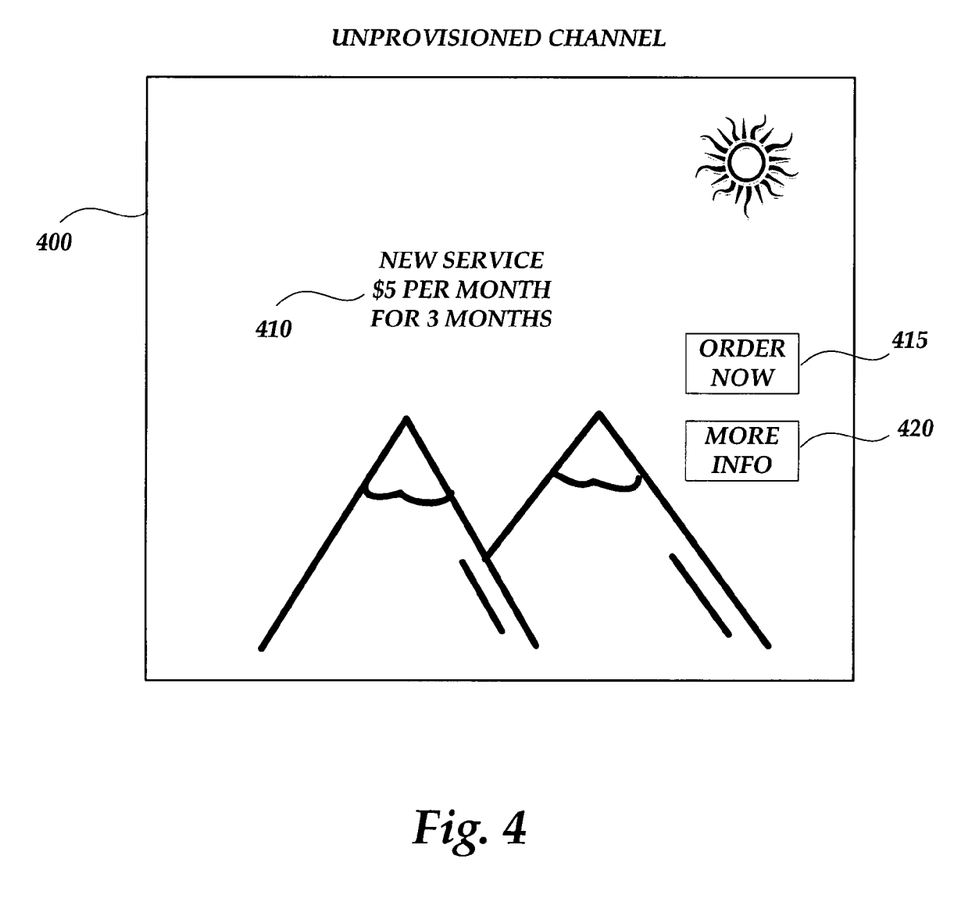
FIG. 4 is a simplified block diagram illustrating a television screen display of a product/services promotional display/user interface according to embodiments of the present invention.

Referring now to FIG. 4, another example user interface for providing information to the customer about offered products and services and for allowing the user to launch the upgrade center user interface 200 is illustrated. According to the screen display (user interface) 400 illustrated in FIG. 4, an unprovisioned channel is utilized by the cable services provider for providing a continuous advertisement or promotion for one or more offered products or services. That is, the cable services provider may utilize a television channel on which no regular television programming is broadcast for broadcasting a continuous product/service offering through which a user may access and launch the upgrade center user interface 200, described above. As should be understood by those skilled in the art, utilization of an unprovisioned channel is advantageous for providing advertising to customers who are "channel surfing" and who may stop at the advertisement provided on the unprovisioned channel to review offered products and services.

As illustrated in FIG. 4, a product/service offering advertisement 410 may be provided to provide a customer with information regarding the offered product or service. One or more buttons 415, 420 may be provided to allow the user to order an offered product or service or for obtaining more information on the offered product or service. For example, selection of the "Order Now" button 415 or selection of the "More Information" button 420 will cause the set-top box 105 to launch the upgrade center user interface 200 onto the customer's television set 120 for ordering a desired product or service or for obtaining additional information on the desired product or service.

Figure 5:
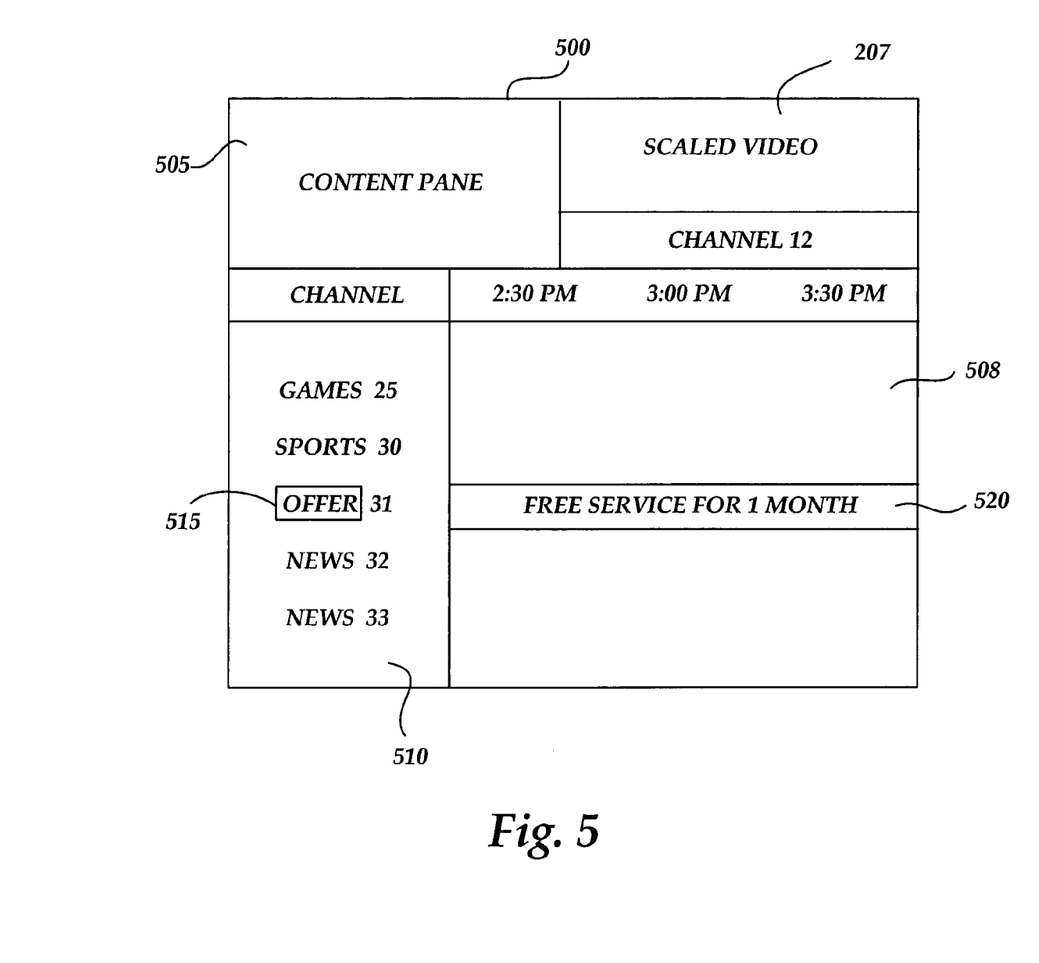
FIG. 5 is a simplified block diagram illustrating a television screen display of an interactive programming guide according to embodiments of the present invention.

The television display screen 500, illustrated in FIG. 5, shows yet another user interface or entry point for selecting an offered product or service and/or for launching the upgrade center user interface 200. The television display screen 500 is illustrative of an interactive program guide (IPG) display screen or user interface with which a customer may be provided programming information for various channels and broadcast times available from her cable services provider. A channel pane 510 is illustrated for providing channel identifications, and a programming pane 508 is illustrated for providing programming information corresponding to individual channels and corresponding to specific broadcasting times. As illustrated in FIG. 5, a given broadcast channel may be utilized by the cable services provider for advertising or offering one or more products or services. According to an embodiment of the present invention, a customer may select a product or service offering directly from the interactive program guide for commencing an ordering process or for launching the upgrade center user interface 200. For example, as illustrated in FIG. 5, channel 31 includes an offer for free service of some specified cable service for one month. According to embodiments of the present invention, the customer may select the channel 31 area of the channel information pane 510 or the user may select the channel information bar 520 for commencing ordering of the offered service or for launching the upgrade center user interface 200.

According to an alternative embodiment of the present invention, a product or service ordering button may be provided in the information pane 370, illustrated in FIG. 3, the advertisement pane 350, illustrated in FIG. 3, the display screen 400, illustrated in FIG. 4, or the display screen 500, illustrated in FIG. 5 for automatically commencing an ordering process, as described below with reference to FIGS. 6 and 7 without the need for launching the upgrade center user interface 200. That is, launching the upgrade center user interface 200 may be bypassed, and the ordering process described below with reference to FIGS. 6 and 7 may be automatically commenced by selecting the provisioning of a particular product or service from the advertisement pane 350, the advertisement information pane 370, or the television display screen 400, or the interactive program guide display described above with reference to FIGS. 3, 4 and 5.

Figure 6:
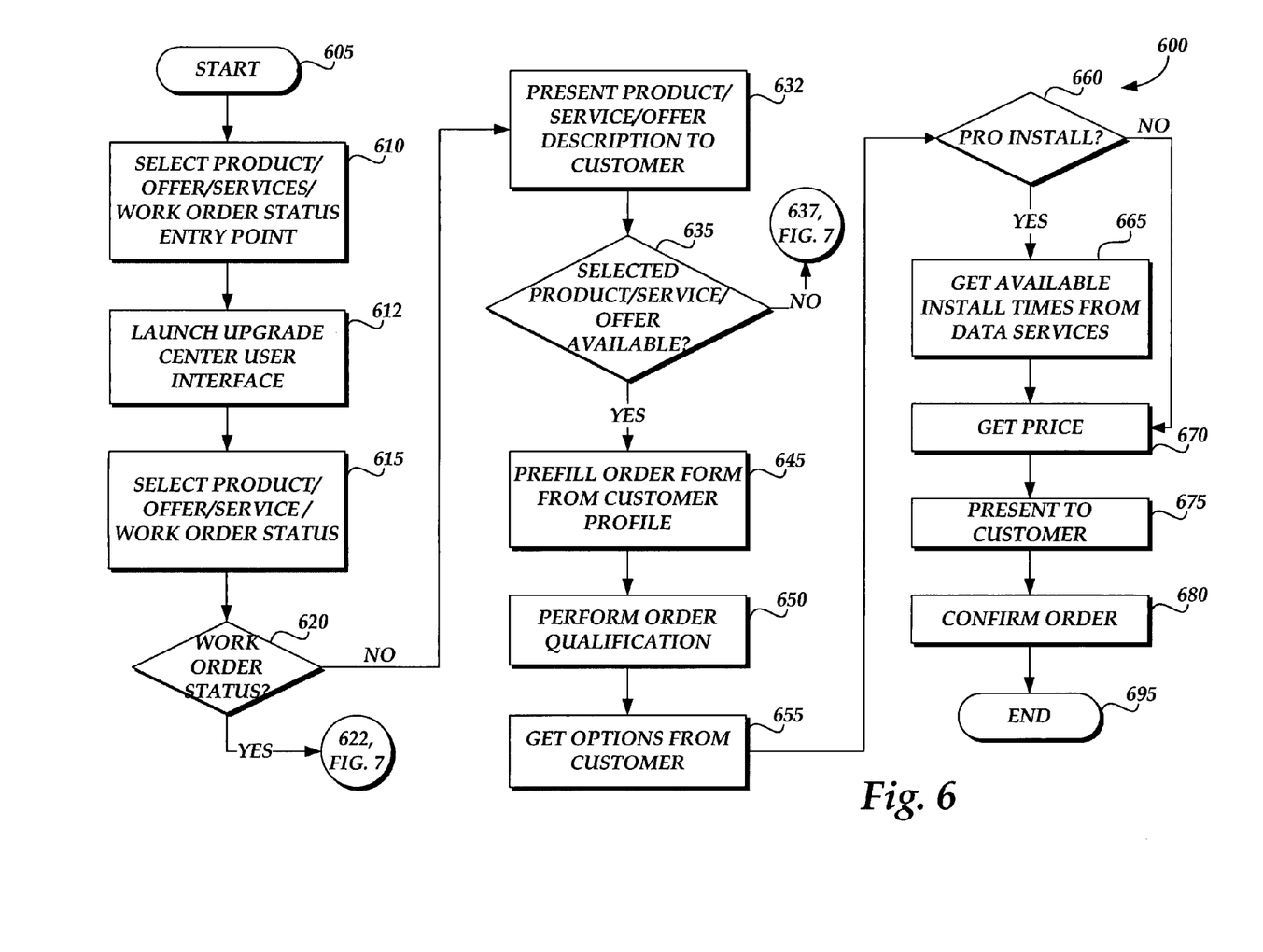
FIGS. 6 and 7 are flow diagrams showing an illustrative routine for self-provisioning products, services, or work order status information via a cable services network.
Figure 7:
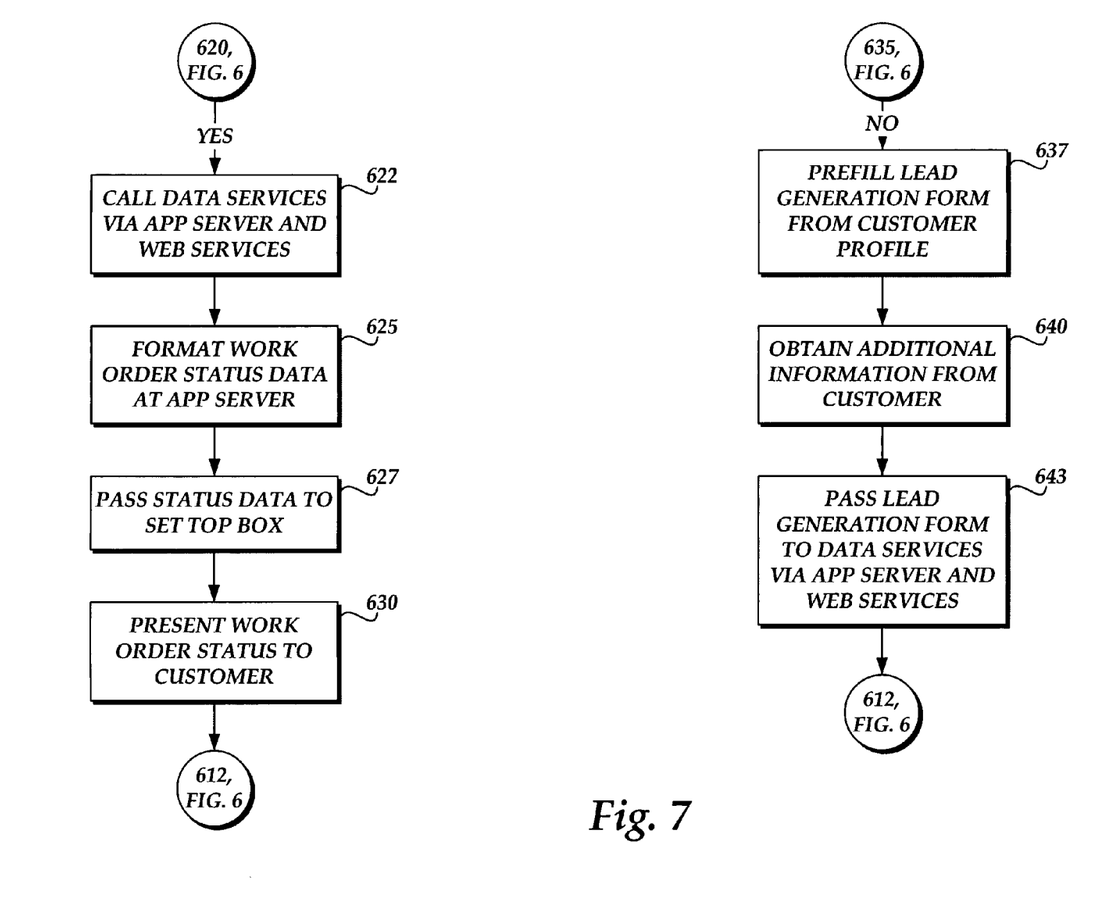

Having described an exemplary operating environment with respect to FIG. 1 and having described example television screen displays/user interfaces with which a cable services customer may access the functionality of the present invention, FIGS. 6 and 7 are flow diagrams showing an illustrative routine for self-provisioning products, services, or work order status information via a cable services network. The routine 600 begins at start block 605 and proceeds to block 610 where a cable services customer selects a product, special offer or new service, or where the customer decides to check the work order status of a previously ordered product or service. As described above with reference to FIGS. 2 through 5, the customer may select a special offer, product, service or work order status via one or more television screens (user interfaces) for launching the upgrade center user interface 200.

At block 612, the upgrade center user interface 200 is launched by the set-top box 105 and is presented to the user at the user's television set 120. At block 615, a customer reviews the upgrade center user interface 200 and selects for review or ordering an offered product, service, special offer, or work order status. At decision block 620, a determination is made as to whether the customer has selected the work order status functionality to review the status of a previously ordered product or service. If the customer does wish to review the status of a previously ordered product or service, the routine proceeds to block 622, illustrated in FIG. 7. At block 622, selection of the work order status functionality by the customer causes a data call from the set top box 105 over the HFC network 115 to the application server 140. The application 140 queries the web services system 150 for status information on previously ordered products or services. According to an embodiment of the present invention, the particular customer is identified by passing an identification of the customer's set-top box 105 to the application server with the data call.

The web services system 150 using the set-top box identification queries the data services system 160 for data representing the status of previously ordered products or services directed to the requesting customer. As described above with reference to FIG. 1, one or more databases may be maintained at the data services system 160, for example the customer information database 168, for containing a variety of information on a given cable services customer and associated with an identified set-top box 105. Accordingly, in response to the data call from the web services system 150, data from the data services system 160 representing the status of any pending product or services work orders associated with the identified set-top box or customer service location/address are returned to the web services system 150 which in turn passes the data to the application server 140. For a detailed discussion of data flow between the set-top box 105 and the server side of the cable services system, see United States patent application, entitled Preparation and Utilization of Customer Profile Data in a Cable Services Network, Ser. No. 10/885,292, filed Jul. 2, 2004, which is incorporated herein by reference as if fully set out herein.

At block 625, the application server formats the data received from the web services system 150 for presentation to the customer in response to the customer's work order status request. At block 627, the status data formatted at the application server 140 is passed to the set-top box 105 via the HFC network 115. At block 630, the set-top box 105 passes the formatted data to the customer's television set 120 and presents a television screen showing the status of the customer's pending work order. According to an embodiment of the present invention, if the customer has more than one pending work order, status for all pending work orders may be presented to the customer at block 630, or the customer may be provided with a list of pending work orders from which to select. Once the customer selects one of the one or more pending work orders, status information for the selected pending work order may be retrieved from the data services system 160 for presentation to the customer as described herein. According to an alternative embodiment, the work order status data may be passed from the application server to the set-top box 105, and the set-top box 105 may format the data for presentation to the customer at block 630.

Referring back to block 620, if the customer selects a particular product, service or special offer from the upgrade center user interface 200, as described above with reference to FIG. 2, or alternatively, if the customer's system is configured to allow the customer to select a product or service directly from an alternative user interface, for example, the user interfaces described with reference to FIGS. 3 through 5, the routine proceeds to block 632. At block 632, the product or services selection by the customer causes the set-top box 150 to retrieve a product or service presentation providing information about the selected product or service. The product or service presentation is passed to the customer's television set by the set-top box 105 and is presented to the customer as a television screen to allow the customer to review helpful information about the selected product including general product description, product availability at the customer's service address, and pricing. As should be understood, other presentation information including video clips associated with the selected product or service and customer critiques of the selected product or service may be presented.

At block 635, a determination is made as to whether the selected product or service is available for provisioning to the requesting customer at the customer's service location/address. According to one embodiment, the determination of selected product/service availability may be performed at the set-top box 105 which may be pre-populated on a periodic basis with data representing the availability of offered products and/or services for the service address associated with the identified set-top box. According to an alternative embodiment, each time a product or service is selected, the set-top box 105 may query the application server 140 via the HFC network 115. The application server 140 may query the data services system 160 via the web services system 150 for information regarding the availability of the selected product or service for the service address associated with the identified set-top box 105.

If a determination is made that the selected product or service is not available for the customer's service address, the routine proceeds to block 637, illustrated in FIG. 7. At block 637, the set-top box 105 prepares a lead generation form for the customer for passing to products/services sales representatives of the customer's cable services provider to notify the cable services provider that the customer would like the selected product or service, and that the customer should be contacted with more information as soon as the selected product or service becomes available at the customer's service address. At block 637, the lead generation form is pre-filled with information about the customer from a customer data profile maintained for the customer at the set-top box 105. The customer data profile includes data on the customer such as the customer's name, address, age, social security number, presently provisioned services, and the like. Other information contained in the customer data profile may include credit information and demographic information. For a detailed discussion of customer data profiles maintained on the cable services customer, see United States patent application, entitled Preparation and Utilization of Customer Profile Data in a Cable Services Network, Ser. No. 10/885,292, filed Jul. 2, 2004, which is incorporated herein by reference as if fully set out herein.

At block 640, the pre-filled lead generation form may be presented to the customer at the customer's television set 120, and the customer may be requested to provide additional information not entered into the lead generation form at block 637. As should be understood by those skilled in the art, the lead generation form presented to the customer may contain a number of fields with selectable information which may be selected by the customer using the remote control device 128. For example, if the customer is interested in ordering high speed Internet services, a selectable field may be presented in the lead generation form asking the customer to identify a desired speed of high speed Internet services for use by the customer at the customer's service address. Using the customer's remote control device 128, the customer may select from available high speed Internet services speeds for completing the lead generation form.

At block 643, the completed lead generation form is passed by the set-top box 105 to the data services system 160 via the HFC network 115, the application server 140 and the web services system 150, as described above. Once the lead generation form is completed by the customer and is passed to data services, as described, the routine may proceed back to block 612 where the customer may utilize the upgrade center user interface 200 for additional product/services selection or information.

Referring back to block 635, if the selected product or service is available for provisioning at the customer's service address, the routine proceeds to block 645, and an order form for the selected product or service is pre-filled at the set-top box 105 with customer data from the customer data profile maintained for the requesting customer as described above. If additional information for the order form is required, the order form may be passed to the requesting customer at the customer's television set 120 so that the customer may provide information for required data fields in the order form.

At block 650, an order qualification process for the selected product or service is performed to determine whether the selected product or service may be provisioned for the customer's service address or to determine whether any data regarding the selected product or service is already present for the customer's service address and for the identified set-top box. First, a determination is made as to whether service codes for the selected product or service are already provisioned for the identified set-top box 105 for the requesting customer. That is, a determination is made as to whether the selected product or service has already been previously ordered and has already been previously provisioned for the requesting customer. It may be that the requesting customer already has the selected service or product provisioned on his/her set-top box 105, but the customer is not aware of his access to the selected service or product. For example, another member of the customer's family or organization may have previously ordered the product but may not have notified the requesting customer. Alternatively, the selected product or service may have been provisioned on the requesting customer's set-top box 105, but for some reason the product or service provisioned for the customer is not accessible by the customer due to some malfunction or other problem.

If the service codes for the selected product or service are already provisioned on the customer's set-top box 105, an error message may be presented to the customer notifying the customer of the previously provisioned product or service. Alternatively, if the product or service is one in which multiple provisionings may be accomplished, the customer may be offered the opportunity to continue with the ordering of the product or service. For example, the customer may be interested in ordering a piece of hardware for use with a different television set in the customer's residence or place of business.

Next, a determination is made as to whether a work order is already open for the selected product or service. That is, a determination is made as to whether the provisioning of the selected product or service is already in progress to the customer's set-top box 105 or to the customer's service address. As with previously provisioned service codes for the selected product or service, it may be that another member of the customer's home or business has previously ordered the product or service and has failed to notify the requesting customer. On the other hand, the requesting customer may be ordering an additional product or service for which multiple items may be provisioned for the customer. In either case, an error message may be presented to the requesting customer to alert the requesting customer of the presently pending work order so that the customer may decide to cancel the presently selected product or service or to continue so as to have an additional selected product or service provisioned for the requesting customer.

Next, a determination may be made as to whether other prerequisites are satisfied for proceeding with provisioning the selected product or service for the requesting customer. For example, a determination may be made as to whether the requesting customer has all required services that are necessary for provisioning the selected service. For example, if the requesting customer has requested electronic mail services via his set-top box 105, a determination may be made as to whether the customer has high speed Internet services provisioned at his service address which is a prerequisite service for obtaining electronic mail services. Other prerequisite information may be reviewed such as required credit history and the like. According to embodiments of the present invention, some or all of the order qualification information may be maintained and periodically updated at the set-top box 105 associated with the requesting customer.

Alternatively, information required for the order qualification process may be maintained at the data services system 160. In the latter case, the order qualification process requires a data call from the set-top box 105 to the application server 140 via the HFC network 115. The application server 140 in turn passes a data call to the web services system 150. The web services system 150 calls the necessary information store at the data services system 160 to obtain the required order qualification information. If the order may not be qualified, information passed back to the application server 140 is formatted into an appropriate error message which is then passed to the set-top box 105 for presentation to the customer at the customer's television set 120.

After order qualification is performed for the selected product or service, the routine proceeds to block 655, and any required options necessary for completing the ordering process are requested from the customer. For example, if the customer is requesting high speed Internet services, a request may be passed to the customer asking the customer to select between one or more available data transmission speeds. Other options include equipment styles and types, whether a customer requires professional installation of an ordered product or service, whether the customer will self-install an ordered product or service, what times are best for the customer for a professional installation of an ordered product, if requested, and the like.

At block 660, a determination is made as to whether the customer has selected professional installation for a selected product or service. If a customer has requested professional installation, the routine proceeds to block 665, and a determination is made as to available installation times. According to one embodiment of the present invention, a determination of available installation times is performed by passing a data request from the set-top box 105 to the application server 140 via the HFC network 115. The application server 140 requests available installation times from the data services system 160 via the web services system 150. As should be understood by those skilled in the art, a database may be maintained in the data services system 160 which includes available installation times for installing the requested product or service at the service address of the requesting customer.

At block 670, data is requested from the data services system 160 regarding pricing for the selected product or service. For example, based on the product or service selected by the customer and the options requested for the selected product or service, a database may be maintained and the data services system 160 for providing pricing associated with the combination of options requested by the customer for the selected product or service. Referring back to block 660, if the customer does not request professional installation, the routine proceeds directly to block 670 to obtain pricing information associated with the selected product or service based on self-installation of the selected product or service.

At block 675, the available installation times, if necessary, and the associated pricing for the selected product or service are passed to the application server 140, and the application server 140 formats the installation times and pricing data into an appropriate message for presentation to the customer. The formatted information is passed from the application server 140 to the set-top box 105, and the set-top box 105 presents the order information to the customer at the customer's television set 120. If the customer is not satisfied with the information contained in the order information, for example if the customer is not available at the offered installation time, the customer may reject the order information, and the customer may be provided the opportunity to select a different installation time. Or, the customer may be able to change certain requested options for the selected product or service if the customer is not satisfied with the pricing associated with the selected product or service. Once product/service information presented to the customer is acceptable, an order confirmation may be presented to the customer at block 680 to confirm that the product or service selected by the customer will be provisioned at the customer's service address as requested. The routine ends at block 695.

As described herein, methods and systems are provided for allowing a cable services customer to efficiently order desired products and services through an automated self-provisioning process provided through an interactive television session between the customer and the customer's cable services provider. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method of automating provisioning of products or services in a cable services system; comprising:
    launching an upgrade center user interface at a customer television set;
    selecting from the upgrade center user interface a product of a cable services provider for provisioning at a customer service location;
    determining whether the selected product of the cable services provider is available for provisioning at the customer service location;
    if the selected product of the cable services provider is available for provisioning at the customer service location, automatically populating a product order form from data in a user profile stored in a set-top-box at the customer service location;
    passing the populated product order form to a cable services provider;
    providing the requesting customer an order confirmation;
    provisioning by the cable services provider the selected product at the customer service location; and
    if the selected product of the cable services provider is not available for provisioning at the customer service location, automatically populating and forwarding to the cable services provider a lead generation form for the customer for passing to sales representatives of the cable services provider to notify the sales representative of the cable services provider that the customer would like to be contacted when the selected product becomes available.

2. The method of claim 1 further comprises presenting an error message to the customer at the customer television set to notify the customer that the selected product is already provisioned at the customer service location, if the selected product is already provisioned at the customer service location.

3. The method of claim 2, wherein the selecting from the upgrade center user interface a product of a cable services provider comprises generating a service work order request requiring installation of the product at the customer service location by the cable services provider, wherein the method further comprises providing status information regarding scheduling of installation times of the product at the customer service location by the cable services provider.

4. The method of claim 3, wherein the preparing the lead generation form further comprises notifying the cable services provider that the customer should be contacted with more information as soon as the selected product or service becomes available at the customer's service address.

5. The method of claim 1 further comprises presenting an error message to the customer at the customer television set to notify the customer that the selected product is already provisioned at the customer service location, if the selected product is already provisioned at the customer service location.

6. The method of claim 1, wherein the selecting from the upgrade center user interface a product of a cable services provider comprises generating a service work order request requiring installation of the product at the customer service location by the cable services provider, wherein the method further comprises providing status information regarding scheduling of installation times of the product at the customer service location by the cable services provider.

7. The method of claim 1, wherein the preparing the lead generation form further comprises notifying the cable services provider that the customer should be contacted with more information as soon as the selected product or service becomes available at the customer's service address.

8. The method of claim 1 further comprising, prior to launching the upgrade center user interface at the customer television set:
    providing a promotional display for a product of the cable services provider at the customer television set; and
    selecting a product for provisioning from the promotional display at the customer service location from the product promotion display.

9. The method of claim 1 further comprising, after selecting the product for provisioning at the customer service location from the upgrade center user interface, displaying a product description for the selected product of the cable services provider at the customer television set.

10. The method of claim 1 further comprising, after automatically populating a product order form:
    determining whether any required prerequisite actions are necessary prior to provisioning the selected product; and
    notifying the customer via the upgrade center user interface of the any required prerequisite actions that are necessary prior to provisioning the selected product of the cable services provider when required prerequisite actions are determined to be necessary prior to provisioning the selected product of the cable services provider.

11. In a cable services system, a system for automating provisioning of products or services; comprising:
    the cable services system operative
        to present an upgrade center user interface at a customer television set;
        to receive data representing a user selecting from the upgrade center user interface a product of a cable services provider for provisioning at a customer service location;
        to determine whether the selected product of the cable services provider is available for provisioning at the customer service location,
        if the selected product of the cable services provider is available for provisioning at the customer service location, to automatically populate a product order form for the selected product from data in a user profile stored in a set-top-box at the customer service location;
        to pass the populated product order form to a cable services provider;
        to provide the requesting customer an order confirmation;
        to provision by the cable services provider the selected product at the customer service location; and
        if the selected product of the cable services provider is not available for provisioning at the customer service location, to automatically populate a lead generation form at the set-top box at the customer service location and receive at the cable services provider the populated lead generation form for the customer for passing to sales representatives of the cable services provider to notify the sales representative of the cable services provider that the customer would like to be contacted when the selected product becomes available.

12. The system of claim 11, wherein the cable services system is further operative to present an error message to the customer at the customer television set to notify the customer that the selected product is already provisioned at the customer service location, if the selected product is already provisioned at the customer service location.

13. The method of claim 12, wherein the cable services system is further operative to select from the upgrade center user interface a product of a cable services provider by generating a service work order request requiring installation of the product at the customer service location by the cable services provider and by providing status information regarding scheduling of installation times of the product at the customer service location by the cable services provider.

14. The method of claim 13, wherein the cable services system is further operative to prepare the lead generation form by notifying the cable services provider that the customer should be contacted with more information as soon as the selected product or service becomes available at the customer's service address.

15. The system of claim 11, wherein the cable services system is further operative to present an error message to the customer at the customer television set to notify the customer that the selected product is already provisioned at the customer service location, if the selected product is already provisioned at the customer service location.

16. The system of claim 11, wherein the cable services system is further operative to select from the upgrade center user interface a product of a cable services provider by generating a service work order request requiring installation of the product at the customer service location by the cable services provider and providing status information regarding scheduling of installation times of the product at the customer service location by the cable services provider.

17. The system of claim 11, wherein the cable services system is further operative to prepare the lead generation form by notifying the cable services provider that the customer should be contacted with more information as soon as the selected product or service becomes available at the customer's service address.

18. The system of claim 11, wherein the cable services system is further operative, prior to launching the upgrade center user interface at the customer television set, to provide a promotional display for a product of the cable services provider at the customer television set and to select a product for provisioning from the promotional display at the customer service location from the product promotion display.

19. The system of claim 11, wherein the cable services system is further operative, after selecting the product for provisioning at the customer service location from the upgrade center user interface, to display a product description for the selected product of the cable services provider at the customer television set.

20. The system of claim 11, wherein the cable services system is further operative, after automatically populating a product order form, to determine whether any required prerequisite actions are necessary prior to provisioning the selected product and to notify the customer via the upgrade center user interface of the any required prerequisite actions that are necessary prior to provisioning the selected product of the cable services provider when required prerequisite actions are determined to be necessary prior to provisioning the selected product of the cable services provider.

* * * * *